Patented Feb. 9, 1954

2,668,855

UNITED STATES PATENT OFFICE 2,668,855

ALKYLENE-BIS(OXYALKYLENE-AMMONIUM) COMPOUNDS

Moses Wolf Goldberg, Upper Montclair, and Lester Mischa Jampolsky, Clifton, N. J., assignors to Hoffmann-La Roche Inc., Nutley, N. J., a corporation of New Jersey No Drawing. Application December 20, 1952, Serial No. 327,162

5 Claims. (Cl. 260—567.6)

The present invention relates to new bis-quaternary ammonium compounds represented by the following general formula:

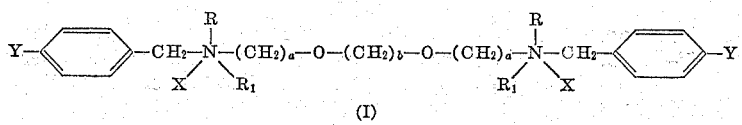

(I)

wherein R and $R_1$ represent lower alkyl radicals; X represents a halogen, e. g. chlorine, bromine or iodine; Y represents a member of the group consisting of nitro and chloro radicals; $a$ represents an integer from 2 to 3; and $b$ represents an integer from 2 to 4. The new compounds as represented by the above Formula I are useful as therapeutic agents, and more particularly are useful as agents having curare-like activity and also sympathetic and parasympathetic blocking action.

In general, the new compounds can be prepared by quaternizing di-tertiary amines of the following formula:

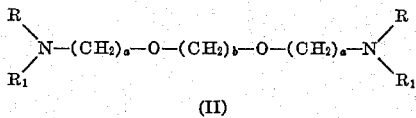

(II)

with a benzyl halide of the following formula

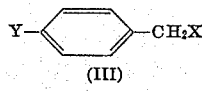

(III)

R, $R_1$, X, Y, $a$ and $b$ having the same meaning as hereinabove assigned thereto.

The preparation of the new di-tertiary amines used as intermediates is illustrated by the following examples:

EXAMPLE A

*2,2'-ethylenedioxybis(triethylamine)*

9.3 grams of ethyleneglycol were dissolved in 500 cc. of absolute dioxane. 6.9 grams of sodium, cut in small pieces, were added and the mixture refluxed with good stirring for 18 hours. 40.5 grams of β-chloroethyldiethylamine in 40 cc. of dioxane were then added to the boiling suspension of the sodium glycolate and refluxing was continued for 20 hours. After cooling, the sodium chloride was filtered off and the dioxane removed in vacuo. The 2,2'-ethylenedioxybis(triethylamine) was obtained as a light yellow oil.

EXAMPLE B

*2,2'tetramethylenedioxybis(triethylamine)*

Nine grams of 1,4-butanediol were refluxed under stirring in 500 cc. of dry dioxane with 4.6 grams of sodium for 20 hours. To the boiling mixture were added 27 grams of β-chloroethyldiethylamine and refluxing continued for 24 hours. After cooling, the sodium chloride was filtered off and the dioxane removed in vacuo. The 2,2'-tetramethylenedioxybis(triethylamine) was obtained as a yellowish oil.

EXAMPLE C

*(3,3'-ethylenedioxyditrimethylene)bis-(diethylamine)*

To 250 ml. of dry dioxane were added 14.3 grams of sodium. Then at 80° C., 19.4 grams of ethylene glycol were added over a period of 40 minutes followed by addition of 200 ml. of dioxane.

After stirring and refluxing for 6 hours, 93 grams of diethylaminopropyl chloride in 100 ml. of benzene were added dropwise. The reaction mixture was stirred and refluxed for 24 hours, then cooled and the sodium chloride which had formed was separated by filtration. The filtrate was evaporated and the residue so formed was distilled in vacuo. The (3,3'-ethylenedioxyditrimethylene)bis(diethylamine) distilled at 108°–110° C. at 0.1 mm. pressure; $n_D^{25}=1.4450$.

The following examples will serve to illustrate the preparation of the new bis-quaternary ammonium compounds represented by the hereinabove given Formula I.

EXAMPLE 1

*(Tetramethylenedioxydiethylene)bis[diethyl-(p-nitrobenzyl)ammonium bromide]*

Four grams of 2,2'-tetramethylenedioxy-bis-(triethylamine) and 6 grams of p-nitrobenzyl bromide were refluxed together in 100 cc. of ethanol for 6 hours. The reaction mixture was evaporated to dryness in vacuo. The residue was crystallized from ethanol-ether. After 4-recrystallizations from ethanolether, the (tetramethylenedioxydiethylene)bis[diethyl(p - nitrobenzyl)ammonium bromide] melted at 177°–178° C. with decomposition.

EXAMPLE 2

*(Ethylenedioxydiethylene)bis[diethyl(p-nitrobenzyl)ammonium bromide]*

Four grams of 2,2'-ethylenedioxybis(triethylamine) and 6.6 grams of p-nitrobenzyl bromide were refluxed together in 200 cc. of benzene for 4 hours. The precipitate which formed was separated and crystallized from ethanol-ether. The (ethylenedioxydiethylene)bis[diethyl(p - nitrobenzyl) ammonium bromide] melted at 180°–182° C. with decomposition.

EXAMPLE 3

*(Ethylenedioxyditrimethylene) bis[diethyl(p-nitrobenzyl) ammonium bromide] hemihydrate*

To 8.6 grams of (3,3'-ethylenedioxyditrimethylene)bis(diethylamine) in 150 ml. of ethanol were added 14.5 grams of p-nitrobenzyl bromide and the solution refluxed for 24 hours. The residue obtained by evaporation of the reaction mixture was crystallized from ethylene chloride and aqueous acetone. The (ethylenedioxyditrimethylene)bis[diethyl(p - nitrobenzyl)ammonium bromide] hemihydrate melted at 66°–70° C.

The anhydrous form of the above compound was prepared by drying the hemihydrate at 65° C. in high vacuo. The anhydrous product had a melting point of 100°–106° C.

EXAMPLE 4

*(Ethylenedioxydiethylene) bis[diethyl(p-chlorobenzyl) ammonium chloride] dihydrate*

To 26 grams of 2,2'-ethylenedioxybis(triethylamine) in 100 ml. of ethanol were added 32.2 grams of p-chlorobenzyl chloride in 100 ml. of ethanol. This solution was refluxed for 18 hours and then evaporated to dryness in vacuo. The residue so obtained was dissolved in ethanol. The oil formed by the addition of ether to the ethanol solution was separated and crystallized from a mixture of methylene chloride and acetone. The colorless crystalline (ethylenedioxydiethylene)-bis[diethyl(p-chlorobenzyl) ammonium chloride]dihydrate melted at 122°–130° C.

The quaternary ammonium compound was prepared in anhydrous form by heating the dihydrate at 60° C. in high vacuo. The product was very hygroscopic.

It will be understood that both the anhydrous and hydrated forms of the novel quaternary ammonium compounds are within the scope of this invention.

This application is a continuation-in-part of our copending application Serial No. 232,463, filed June 19, 1951, now U. S. Patent 2,624,763.

We claim:

1. Bis-quaternary ammonium compounds represented by the formula

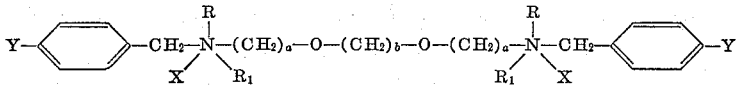

wherein R and $R_1$ represent lower alkyl radicals; X represents a halogen; Y represents a member of the group consisting of nitro and chloro radicals; $a$ represents an integer from 2 to 3; and $b$ represents an integer from 2 to 4.

2. (Tetramethylenedioxydiethylene) bis [diethyl(p-nitrobenzyl) ammonium bromide].

3. (Ethylenedioxydiethylene)bis[diethyl(p - nitrobenzyl) ammonium bromide].

4. (Ethylenedioxyditrimethylene) bis [diethyl-(p-nitrobenzyl) ammonium bromide].

5. Ethylenedioxydiethylene) bis [diethyl (p-chlorbenzyl) ammonium chloride].

MOSES WOLF GOLDBERG.
LESTER MISCHA JAMPOLSKY.

No references cited.